UNITED STATES PATENT OFFICE.

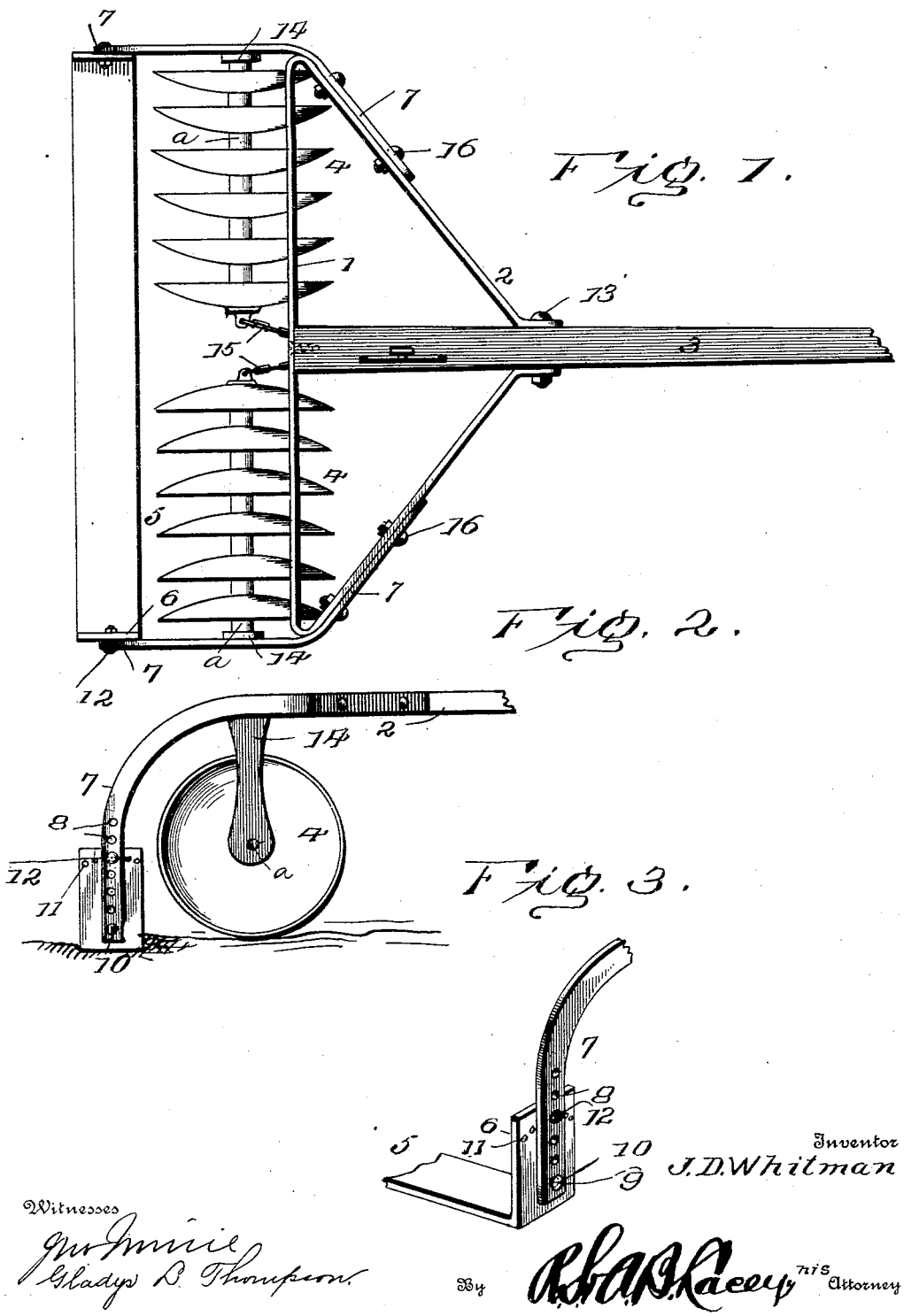

JOHN D. WHITMAN, OF MEDFORD, OREGON.

WEED-CUTTER FOR CULTIVATORS.

SPECIFICATION forming part of Letters Patent No. 684,154, dated October 8, 1901.

Application filed January 28, 1901. Serial No. 45,081. (No model.)

*To all whom it may concern:*

Be it known that I, JOHN D. WHITMAN, a citizen of the United States, residing at Medford, in the county of Jackson and State of Oregon, have invented certain new and useful Improvements in Weed-Cutters for Cultivators; and I do hereby declare the following to be a full, clear, and exact description of the invention, such as will enable others skilled in the art to which it appertains to make and use the same.

This invention has relation to implements for tilling the soil, and aims to combine with a cultivator of the disk type a blade or cutter for operation in the rear of the cultivating devices to effectually eradicate weeds and objectionable growths.

The invention consists of the peculiar formation of the blade and mountings therefor, whereby the blade can be adjusted vertically and to any required pitch best suited to the nature of the soil and character of work.

For a full description of the invention and the merits thereof and also to acquire a knowledge of the details of construction of the means for effecting the result reference is to be had to the following description and drawings hereto attached.

While the essential and characteristic features of the invention are necessarily susceptible of modification, still the preferred embodiment of the invention is illustrated in the accompanying drawings, in which—

Figure 1 is a top plan view of a cultivator, showing the application of the invention thereto. Fig. 2 is a side view. Fig. 3 is a detail perspective view of the blade and the supporting bars or standards therefor.

Corresponding and like parts are referred to in the following description and indicated in all the views of the drawings by the same reference characters.

The cultivator or implement illustrated comprises a draft-frame of approximately triangular form, a pole or tongue, and a gang of earth-treating devices. The draft-frame consists of a transverse bar 1 and forwardly-convergent bars 2, spaced apart at their front ends, so as to receive the pole or tongue, which is clamped between them by means of the bolt 13. The rear end of the pole or tongue 3 is connected to the central portion of the bar 1.

The earth-treating devices consist of gangs of disk cutters 4, mounted upon shafts a, supported at their outer ends by hangers 14, and having their inner ends connected to the draft-frame by chains or analogous means 15. Standards 7 are secured at their front ends to the draft-frame and their rear end portions curve downwardly and, receive the blade 5, which has adjustable connection therewith. The front ends of the standards 7 are bent inwardly and bolted to the convergent bars 2, thereby serving in a measure to stiffen and strengthen said bars and to relieve in a measure the strain upon the bolts or fastenings 16.

The weed-cutter operates in the rear of the cultivating devices and consists of a blade 5, having its end portions 6 bent at a right angle and adapted to be adjustably connected to the lower rear ends of bars or standards 7, which are made fast at their forward ends to the frame. A series of openings 8 are formed in the lower rear ends of the standards 7 and admit of the vertical adjustment of the blade or cutter 5. An opening 9 is formed in the lower portion of each bent end 6, intermediate of its front and rear edges, and receives a bolt or fastening 10, upon which the blade turns when it is required to vary its pitch or inclination to meet various conditions of work and secure the best possible results. A series of openings 11 are formed in the upper end portion of each bent end 6, and these openings are disposed in the arc of a circle concentric with the opening 9 and are adapted to receive a bolt or fastening 12, by means of which the blade or cutter is held in an adjusted position. When it is required to throw the cutter out of action, the lower bolts or fastenings 10 are removed and the upper bolts or fastenings 12 loosened, after which the cutter is turned upon the fastenings 12, thereby throwing the blade 5 up out of contact with the ground, as will be readily appreciated, said cutter being secured by retightening the bolts 12. The cutter can be raised and lowered by removing the bolts or fastenings 10 and 12, and after the desired adjustment has been effected the cutter is secured by replacing the bolts or fastenings 10 and 12 in coincident openings 8, 9, and 11, as will be readily comprehended. The cutter extends the full width of the cultivator and in operation eradicates weeds and other objectionable growth in the path thereof. The blade is sufficiently stout to perform the desired work in a thorough and effective manner, and its lower edge may be shortened, if desired, to facilitate the destruction of the weeds and the passage of the blade through the soil loosened by the cultivating devices. In addition to cutting and destroying the weeds the blade 5 acts in the capacity of a clod-crusher and leveler and smooths the soil and pulverizes the same in the wake of the cultivator.

After the blade has been adjusted with reference to the disks its depth of action will depend upon the depth of penetration of the disks. The blade removes all traces of the disks upon the soil and pulverizes and levels the same.

Having thus described the invention, what is claimed as new is—

1. In combination, a draft-frame, standards secured at their front ends to the draft-frame and having their rear end portions curved downwardly and provided with a vertical series of openings, cultivator devices attached to the said standards, a blade having its end portions bent at a right angle and having the bent ends provided with pivot-openings and a series of openings concentric with the pivot-openings, and fastenings cooperating with the several openings in the bent ends of the blade and in the standards to secure the blade in the desired vertical and angular position, substantially as set forth.

2. In combination, a draft-frame of approximately triangular form and arranged with the convergent bars forward, standards having their front end portions inwardly bent and secured to the convergent bars of the draft-frame and having their rear ends downwardly curved and provided with a vertical series of openings, hangers secured to the standards, gangs of earth-treating devices having the outer ends of their shafts supported by the said hangers, flexible connections between the inner ends of the shafts and the draft-frame, a blade having its end portions bent at a right angle and having the bent ends provided with pivot-openings and a series of openings concentric with the pivot-openings, and fastenings cooperating with the several openings in the bent ends of the blade and in the standards to secure the blade in the desired vertical and angular position, substantially as set forth.

In testimony whereof I affix my signature in presence of two witnesses.

JOHN D. WHITMAN. [L. S.]

Witnesses:
HERBERT L. GILKEY,
WILLIAM I. VAWTER.